United States Patent [19]

Ness-Cohn et al.

[11] Patent Number: 5,428,823

[45] Date of Patent: Jun. 27, 1995

[54] METHOD FOR A COMMUNICATION UNIT TO ACCESS AND UTILIZE INFORMATION FROM AN ALLOCATOR

[75] Inventors: David J. Ness-Cohn, Lisle; Lewis H. Rosenthal, Buffalo Grove, both of Ill.; David Bar-On, Rehovot, Israel

[73] Assignee: Motorola, Inc., Schaumburg, Ill.

[21] Appl. No.: 277,691

[22] Filed: Jul. 20, 1994

Related U.S. Application Data

[63] Continuation of Ser. No. 841,964, May 4, 1992, abandoned.

[51] Int. Cl.6 .......................... H04B 7/26; H04Q 7/28
[52] U.S. Cl. .................................. 455/54.2; 455/53.1
[58] Field of Search ................ 455/33.1, 34.1, 53.1, 455/54.1, 54.2, 185.1, 186.1; 379/58, 59, 63

[56] References Cited

U.S. PATENT DOCUMENTS 4,723,264  2/1988  Sasuta et al. ................. 455/34.1 X
5,127,040  6/1992  D'Avello et al. ................. 379/58

Primary Examiner—Edward F. Urban
Assistant Examiner—Chi H. Pham
Attorney, Agent, or Firm—Wayne J. Egan

[57] ABSTRACT

In a communication system, a communication unit may access increased information in the following manner. The communication unit transmits an information access request to the communication resource allocator of the communication system, wherein the information access request comprises a selection of pre-established information for that communication unit. Upon receiving the information access request, the communication resource allocator retrieves pre-established information based upon the request and transmits it to the communication unit. The communication unit temporarily stores the pre-established information and executes a system service based upon the retrieved pre-established information.

4 Claims, 2 Drawing Sheets

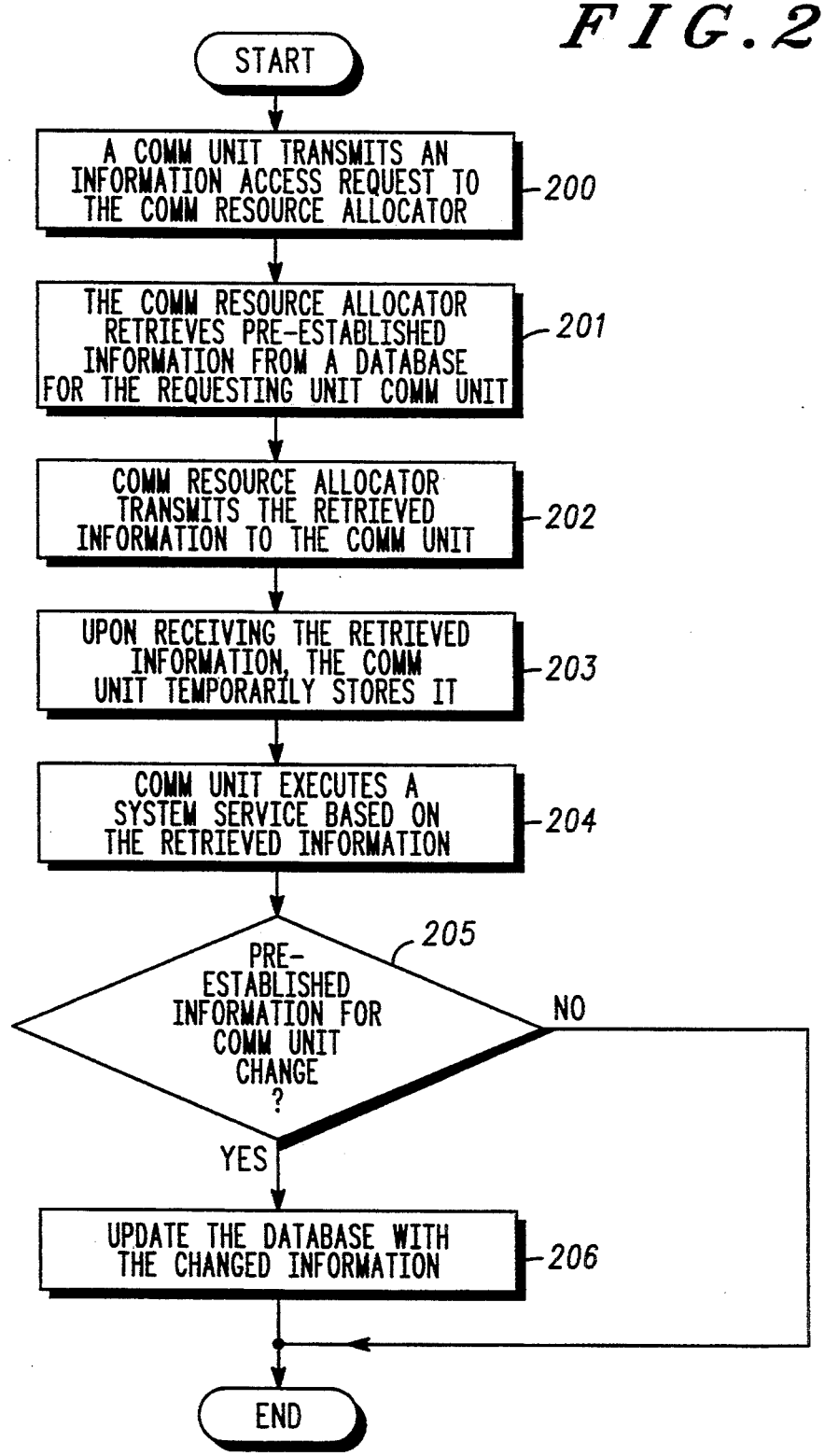

METHOD FOR A COMMUNICATION UNIT TO ACCESS AND UTILIZE INFORMATION FROM AN ALLOCATOR

This is a continuation of application Ser. No. 07/841,964, filed May 4, 1992 and now abandoned.

FIELD THE INVENTION

This invention relates generally to communication systems and in particular to a method that provides increased information availability to communication units.

BACKGROUND OF THE INVENTION

Communication systems are known to comprise a plurality of communication units that are arranged into communication groups, a limited number of communication resources that are transceived via repeaters, and a communication resource allocator that allocates the limited number of communication resources among the plurality of communication units. Of the limited number of communication resources, one is selected as the control channel which transceives operational data between the communication resource allocator and the plurality of communication units. In addition, the communication resources may be TDM allocated slots, frequency carriers, pairs of frequency carriers, or any other RF transmission means.

As is also known, communication units comprise processing circuitry and memory. Typically, the memory is of a fixed size and stores operational data for that particular communication unit. For example, the operational data may comprise an individual identification code for the communication unit, the talk group that the communication unit is affiliated with, types of services the communication may request, and other such dam. Because the amount of memory is generally fixed in a communication unit, it can only store a limited amount of operational data. Thus, when new features become available, the communication units either has to increase its memory or not be able to access them. Therefore, a method is needed that allows a communication unit to access more information without substantially increasing its internal memory.

SUMMARY OF THE INVENTION

These needs and others are substantially met by the method for increasing information availability to communication units disclosed herein. In a communication system that includes a plurality of communication units, a limited number of communication resources that are transceived via repeaters, and a communication resource allocator that allocates the limited number of communication resources among the plurality of communication units, the following comprises a method that provides increased information availability to a communication unit. The process begins when a communication unit transmits an information access request to the communication resource allocator, wherein the information access request comprises a selection of pre-established information for the communication unit. When the communication resource allocator receives the information access request, it retrieves the pre-established information from a communication unit information data base and transmits the retrieved pre-established information to the communication unit. Upon receiving the pre-established information, the communication unit temporarily stores it and executes a system service based upon the retrieved pre-established information.

BRIEF DESCRIPTION OF THE DRAWINGS

FIG. 2 illustrates a logic diagram that may be used to implement the present invention.

DESCRIPTION OF THE PREFERRED EMBODIMENT

Figure 1:
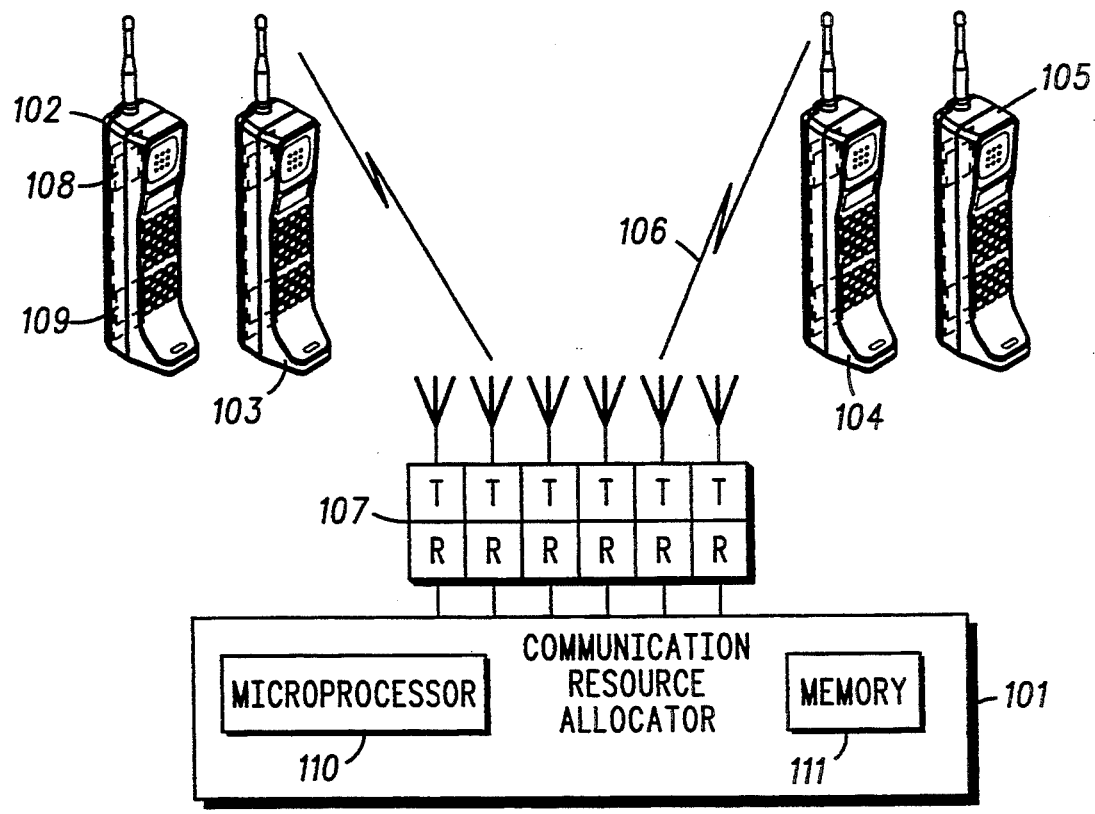
FIG. 1 illustrates a communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105 comprises at least one microprocessor 108 and a digital storage memory device 109 that may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

The amount of information that may be stored at any instant in the digital storage memory device 109 of a communication unit 102105 is physically limited based on the device used. Typically, the amount of information that can be stored in a digital storage memory device 109 is much less than the amount of information that can be stored in the digital storage memory device 111 in the communication resource allocator 101. To overcome this limitation, a method is described in FIG. 2 that allows the digital storage memory device 111 that resides in the communication resource allocator 101 to be used as an extension to the digital storage memory device 109 in each of the communication units 102-105.

At step 200 of FIG. 2, a communication unit transmits an information access request to the communication resource allocator. In the preferred embodiment, this request is comprised of the communication unit's ID and an index that specifies which information is of interest. In the case of providing a communication unit with necessary talkgroup information, the index is the same as the position of the talkgroup selector mechanism on the communication unit. The selector mechanism may be a knob or a keypad entry device.

The communication resource allocator uses the index to retrieve pre-established information from a database, which is located within the digital storage memory of the communication resource allocator, for the requesting communication unit at step 201. In this case, the pre-established information is the talkgroup ID of the talkgroup that is assigned to the position of the talkgroup selector mechanism of the requesting communication unit that is specified by the index. Other data that may be part of the pre-established information includes the talkgroup alias and all other parameters that are commonly part of the data block that describes the characteristics of the talkgroup as needed by the communication unit.

The communication resource allocator transmits the retrieved information to the communication unit at step 202. Upon receipt of the information, the communication unit temporarily stores it in its digital storage memory device at step 203. In the preferred embodiment, the talkgroup information that is received is stored in the memory locations that are used by the communication unit for information referenced by the position of the talkgroup selector mechanism. This received information is used by the communication unit in step 204 in the execution of a system service. For example, the talkgroup information may be used to generate a channel request for the talkgroup.

At any time, the information that was pre-established in the memory of the communication resource allocator may be modified. Typically this is done by a system manager through a manager application. The function of a system manager is known, thus no further discussion will be presented. This is carded out in steps 205 and 206. The next time the communication unit requests the pre-established information from the database in the communication resource allocator, the new information is retrieved by the communication resource allocator and transmitted to the communication unit.

The above describes a method that allows a communication unit to overcome its memory limitations by using the memory resources of the communication resource allocator as part of the communication unit's virtual memory. This is accomplished using over-the-air management of a communication unit's virtual memory. The communication unit is more functional as system services that require pre-established information to execute are no longer limited to the amount of information that can be stored in the communication unit as were communication units described in prior art.

We claim:

1. In a communication system that includes a plurality of communication units, a limited number of communication resources that are transceived via repeaters, and a communication resource allocator that allocates the limited number of communication resources among the plurality of communication units, a method for providing increased information availability to a communication unit, the method comprises the steps of:
   a) transmitting, by a communication unit, an information access request to the communication resource allocator, wherein the information access request comprises a selection of pre-established information for the communication unit;
   b) when the communication resource allocator receives the information access request, retrieving, by the communication resource allocator, the pre-established information from a communication unit information database;
   c) transmitting, by the communication resource allocator, the retrieved pre-established information to the communication unit;
   d) when the communication unit receives the retrieved pre-established information, temporarily storing the retrieved pre-established information by the communication unit; and
   e) when the communication unit temporarily stores the retrieved pre-established information, executing a system service based upon the retrieved pre-established information.

2. The method of claim 1 further comprises updating the communication unit information database when new information is available for a communication unit.

3. In a communication system that includes a plurality of communication units, a limited number of communication resources that are transceived via repeaters, and a communication resource allocator that allocates the limited number of communication resources among the plurality of communication units, a method for a communication unit to access increased information, the method comprises the steps of:
   a) transmitting an information access request to the communication resource allocator, wherein the information access request comprises a selection of pre-established information for the communication unit;
   b) receiving retrieved pre-established information from the communication resource allocator;
   c) upon receiving the retrieved pre-established information, temporarily storing the retrieved pre-established information; and
   d) upon temporarily storing the retrieved pre-established information, executing a system service based upon the retrieved pre-established information.

4. In a communication system that includes a plurality of communication units that are arranged into communication groups, a limited number of communication resources that are transceived via repeaters, and a communication resource allocator that allocates the limited number of communication resources among the plurality of communication units, a method for a communication unit to access communication group information, the method comprises the steps of:
   a) transmitting a communication group request to the communication resource allocator, wherein the communication group request comprises a selection of one of a predetermined number of communication groups;
   b) receiving identifying information of the one of the predetermined number of communication groups from the communication resource allocator;
   c) upon receiving the identifying information of the one of the predetermined number of communication groups, temporarily storing the identifying information of the one of the predetermined number of communication groups; and
   d) upon temporarily storing the identifying information of the one of the predetermined number of communication groups, executing, by the communication unit, a system service within the one of the predetermined number of communication groups.

* * * * *